United States Patent Office 3,697,257
Patented Oct. 10, 1972

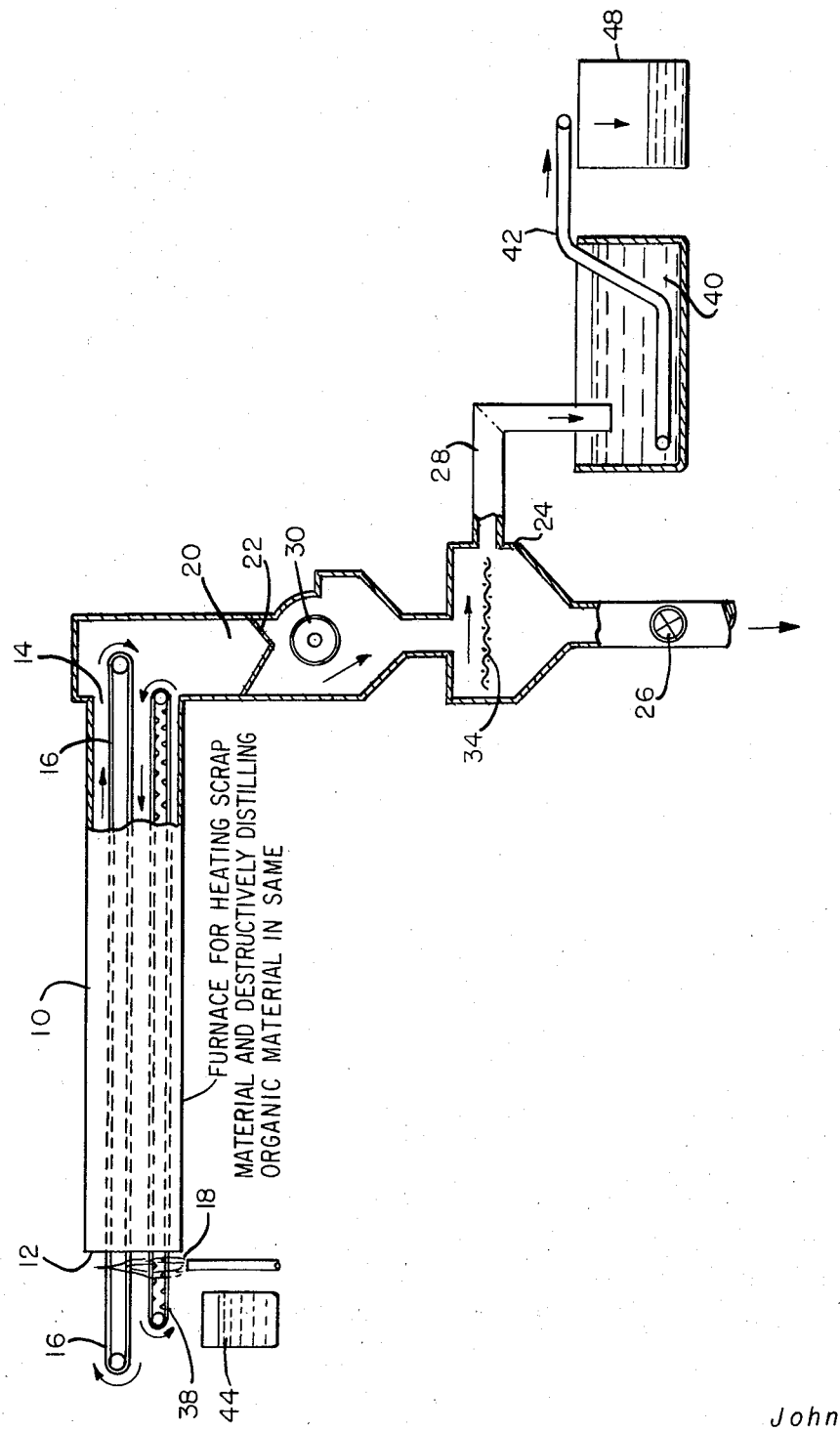

3,697,257
SCRAP RECOVERY PROCESS
John E. Perry, Bay Village, Ohio, assignor to
Horizons Research Incorporated
Filed Nov. 7, 1969, Ser. No. 874,891
Int. Cl. C22b 25/06
U.S. Cl. 75—64                    6 Claims

ABSTRACT OF THE DISCLOSURE

The recovery of metal values in scrap materials by destructive distillation removal of organic non-metal materials, at temperatures which leave the metal relatively unaffected.

---

This invention relates to the recovery of metal values in scrap materials in which the metal values are associated with non-metallic materials, such as insulation on scrap wire.

Among the methods which have been suggested for recovering the metal values separately from the non-metal associated therewith are incineration or burning of combustible material, such as plastics, rubber, resin or paper, carried on the metal, which it is desired to reclaim. Such methods require an oxidizing atmosphere and usually are carried out at relatively high temperatures. As a consequence, substantial amounts of the metal are oxidized with consequent loss of metal product salvaged as metal.

Another method which has been suggested involves heating metal scrap and the non-metallic materials found with it in a retort or closed chamber. Such a procedure requires the treatment of small batches of product and is inherently more expensive than a process in which the material is processed continuously in an orderly manner through a suitable apparatus.

These and other suggested procedures in which the materials are exposed to relatively high temperatures are objectionable for at least two reasons. First, because the metal is contaminated by oxidation and second because the physical properties of the metal which is later recovered are usually adversely affected by the overheating, and are, therefore, not as good as those possessed by the metal before it was processed for removal of the undesired organic or inorganic materials which may be considered as contaminating the metal to be recovered.

One object of the present invention is to provide a process in which waste materials associated with metal scrap are continuously removed from the metal by a simplified, continuous process which avoids the smoke generated and overheating accompanying combustion processes, and in which the metal is recovered in a relatively uncontaminated state while it retains its physical properties and in which the major portion of the contaminating non-metallic material is recovered as a volatile or condensible gaseous product which is useful as a fuel or heating means.

Briefly, the method of the present invention consists of heating the contaminated scrap, in the absence of oxygen, to a temperature at which all of the volatile components are distilled off, using a continuous feed and removal of residue. At the temperatures involved, some volatile components are formed by destructive distillation. The volatile components, liquid and gas fractions, may be collected for reuse or they may be ignited and burned with a smokeless, odorless flame.

Another object of the invention is to provide an apparatus for carrying out the above described process, which apparatus includes:

a furnace in which scrap is heated in the absence of any appreciable amounts of oxygen to temperatures at which all of tthe volatile components are distilled from the metal scrap itself;

means for continuously introducing scrap to be processed into the furnace and for removing scrap from the furnace after it has been processed, said means including equipment for recovering those portions of the scrap which melt during the heating;

a flame curtain at the entrance end of the furnace, or other means for protecting the furnace atmosphere from contamination by air or oxygen;

a discharge chute at the exit end of the furnace, through which processed scrap, solid non-metal residue and furnace atmosphere all flow downwardly; and means to separately collect and recover the processed scrap, any non-metal solid residue and any gaseous products produced as a result of passage of the charge through the furnace.

The aapparatus may also include auxiliary means to enhance the recovery of a more saleable, e.g. less contaminated metal product including such devices as means for crushing, sieving and other devices for physically separating metal from non-metal, and other means for improving the form of product including cleaning means and/or melting means, if such additional treatments are found to be economically desirable.

By means of appropriate seals at the inlet and outlet of a heated zone, a continuous feed is carried through the heated zone, and the distillation takes place in an inert atmosphere at atmospheric pressure. At start up, an inert gas, such as nitrogen, is used to purge the heated zone of air. After the reaction starts, the gas formed by the destructive distillation furnishes an oxygen-free atmosphere.

When the contaminants associated with the metal scrap are organic materials, such as rubber or synthetic resins or paper, the residue which remains on the metal scrap after heating is usually a light-weight dry coke. When the coke is separated from the metal and recovered, the coke may be used as a clean fuel or as a land fill or in any other suitable way.

When the contaminants associated with the metal scrap are inorganic materials, such as asbestos or fiberglass, the residue becomes brittle and can be readily detached from the metal scrap which remains virtually unaffected.

A special situation exists when the contaminants to be removed from the metal scrap include materials, such as tin or solder which melt at the usual operating temperature. When such materials are accompanied by substantial amounts of organic material, the tin or solder is usually taken up by the coke residue, from which the tin or solder can be recovered by incinerating the coke in an oxidizing atmosphere.

The metal scrap, after the heating step, is processed to effect physical separation of the residue still attached to the scrap metal, from that metal, e.g. by action of beaters, brushes or scrapers, or by exposure to sound waves or any other known means for physicaally detaching the major part of the residue (coke, char, glass or tin containing coke) from the metal scrap, the recovery of which is the object of the process.

In order to remove the last traces of residue from the metal scrap, it is then passed through a fused salt bath, as hereinafter described, the composition of the fused salt being such that the coke or any other organic residue is oxidized at a relatively low temperature.

Thereafter the metal scrap is withdrawn from the salt bath and after the salt has been permitted to drain from the metal scrap, the scrap can be washed or rinsed, or recovered as it stands.

The invention will be more fully understood from a consideration of the description which follows taken in conjunction with the drawings in which a schematic apparatus for carrying out the invention is shown.

As shown, the apparatus includes a furnace 10 which may be similar to a conventional powder metallurgy furnace or a rotary furnace. Furnace 10 has an inlet end 12 and an outlet end 14, and is provided with a conveyor 16, for example, a stainless steel belt for carrying scrap material through the furnace. Furnace 10 is provided with means to supply heat to the furnace for start-up and for maintaining the temperature of the furnace substantially constant at a controlled level during operation. A flame curtain 18 is provided at the inlet end of the furnace to keep air out of the furnace and to maintain a non-oxidizing atmosphere in the furnace 10. Gases produced by the destructive distillation in furnace 10 burn at the flame curtain 18 at the inlet end.

From the furnace, the product discharged at the outlet end 14 falls through a chute 20. Beneath the chute 20 is a hopper 24 with a bottom discharge through a star value 26 and a side discharge through a side arm 28.

As noted above, the scrap product emerging from the outlet end 14 of furnace 10 usually carries a coke or ash like residue which adheres to the metal. This may be detached from the metal by means located in chute 20, such as a rolling ring crusher 30, or by other physical means. The scrap and loosened char fall onto a vibrating screen 34 which permits the coke-like residue to fall free of the metal to a collection bin. The metal, with any remaining residue, is conveyed from the screen 34 to a heated fused salt bath 40, such as is described in U.S. Pat. No. 3,000,766 and in U.S. pending application, Ser. No. 804,018, filed Mar. 3, 1969 and now U.S. Pat. 3,615,815, issued on Oct. 26, 1971.

After the furnace is started and before raw material is put through on a continuous belt or continuous bucket conveyor, an initially neutral atmosphere can be provided consisting of gases such as nitrogen, hydrogen, cracked ammonia, and/or carbon dioxide. As soon as the organic material on its wire starts to pyrolyze, is substantially all cases, the gaseous products of the pyrolyzed organic material will form a protective atmosphere whch is non-oxidizing in character, since the majority of organic insulation is usually composed of synthetic resin or paper, or natural resins.

The gases evolved provide the necessary controlled atmosphere. As much as 90% or more of the usual organic insulation is charred and destructively distilled in a matter of minutes in a temperature range between 900° F. and 1500° F., and the char formed is easily detached from the metal, as indicated above. As such temperatures, the metal is not oxidized appreciably, nor is it adversely affected by the brief heating to which it is subjected.

The coke was removed from the wire with a rolling ring crusher and the mixture was separated on a vibratory screen. The screen was formed of a perforated sheet with ¼" holes.

The product was of uniform quality independent of diameter of wire; gauge sizes tested varied from No. 6 to No. 25. A slight discoloration on the wire was removed in the salt bath. Only a slight reaction was noted when the wire was placed in the salt bath and the reaction was complete in less than a minute.

It should be noted that the operating temperature is above the melting point of lead. Lead sheathed wire may be fed to the furnace and the lead removed by melting. The mechanism for removal of lead from the furnace would be the belt 38 which would be designed with buckets to collect the molten lead and deposit the metal on the inlet end of the furnace. This additional feature is shown schematically in the drawing, at 44.

The second conveyor 38 positioned beneath conveyor 16 in furnace 10 catches non-gaseous products formed when the insulation and other coating materials burn off the wire and discharges them at the inlet end of the furnace.

Crushing and screening should be done while the metal scrap, e.g. wire, is hot to conserve heat at the salt bath. These operations would be done in the atmosphere of the furnace. Coke is removed through a star (rotary) valve 26 and metal or wire is conducted into the salt bath 40 into which it passes below the surface of the salt. A continuous conveyor 42 removes the wire from the salt bath and discharges the wire product into a container 48.

The method is described more fully in the following example.

Feed material was from representative samples of insulation wire. The insulation material included polyvinyl chloride, neoprene, paper, cloth, rubber, polyethylene, fiberglass, and various varnishes and waxes. The feed was cut to a size to produce a free flowing mixture. Each of the insulation materials was treated in the above described apparatus, separately and then in mixtures; no difference was found in reactivity of the organic materials under the conditions of operation specified above, i.e. absence of oxygen and at temperatures at which organic materials were destructively distilled.

In a series of runs in which tin coated copper wire was processed, then tin content of the coke residue averaged about 0.32 weight percent. The tin was completely removed from the copper wire by maintaining the furnace temperature at 850° F. or higher. At higher temperatures, such as 1200° F., the tin is completely removed in as short a residence time in furnace 10 as 1.5 minutes. Similar results were obtained for the removal of lead solders from soldered scrap, by melting the solder.

It is also to be noted that the furnace 10 includes two parallel conveyors, one disposed above the other. These run in opposite directions so that scrap being processed is conveyed by the upper run of the uppermost conveyor away from the entry end and towards the discharge end of the furnace, while separated material is conveyed by the upper run of the lowermost conveyor towards the entry end and away from the discharge end of the furnace.

Also the evolution of gas during the distillation process results in an excess of gas in the furnace and some gas passes down into hopper 20 and out valve 22 when it is opened, further protecting the furnace from contamination by air or oxygen.

The metal product may be recovered without crushing or sieving or fused salt cleanup, if desired, or it may be melted or otherwise processed without departing from the spirit of the present invention.

From the foregoing it will be readily seen that the process and apparatus of this invention may be applied to a wide spectrum of waste materials from which it is desired to reclaim the metal values.

I claim:

1. A continuous process for the recovery of metal values from a scrap material consisting of (1) the metal values to be recovered and (2) contamination selected from the group consisting of organic material, inorganic materials including metals, and mixtures of organic and inorganic materials, which comprises:

continuously charging said scrap material into a furnace;

conveying said scrap material through said furnace while heating said scrap material in said furnace in the absence of any substantial amounts of oxygen, said heating being to between 900° F. and 1500° F., a temperature at which substantially all of the volatile constituents present are distilled from the starting material and the non-volatile non-metallic material forms a carbonaceous residue on the metal values of the scrap and being below the melting point of the metal to be recovered;

discharging the heated scrap material from said furnace;

thereafter physically detaching at least the major part of the carbonaceous residue from the discharged heated scrap material and separately recovering the resulting material after the major portion of the residue has been detached and separated from the discharged heated scrap;

immersing the recovered resulting material and any residue remaining thereon, in a fused salt bath wherein such residue is oxidized and removed from the metal values in said scrap;

and finally recovering the cleansed metal after immersion in said fused salt bath.

2. The process of claim 1 wherein the scrap includes copper coated with lead and the lead is recovered as a melt, separately from the other metal values in the scrap.

3. The process of claim 1 wherein the scrap consists principally of copper wire.

4. The process of claim 1 wherein the scrap consists of pieces of copper covered with plastics, rubber, resin or paper and the first heating step converts the organic materials to a light-weight dry coke.

5. The process of claim 1 wherein the scrap includes copper coated with tin or a tin alloy and the tin is recovered from the carbonaceous residue separated from the metal values.

6. The process of claim 5 in which the tin is recovered by oxidation of the carbon in the carbonaceous residue, leaving the tin as a residue.

References Cited

UNITED STATES PATENTS

| | | | |
|---|---|---|---|
| 2,815,278 | 12/1957 | Wilkens | 75—65 |
| 3,000,766 | 9/1961 | Wainer | 134—2 |
| 160,018 | 2/1875 | Holliday et al. | 75—64 |

FOREIGN PATENTS

| | | | |
|---|---|---|---|
| 565,761 | 11/1958 | Canada | 75—63 |

WINSTON A. DOUGLAS, Primary Examiner

M. J. ANDREWS, Assistant Examiner

U.S. Cl. X.R.

75—77, 85